United States Patent [19]

Wulff et al.

[11] Patent Number: 5,235,026

[45] Date of Patent: Aug. 10, 1993

[54] CONTINUOUS PRODUCTION OF POLYCARBONATES

[75] Inventors: Claus Wulff; Hermann Kauth, both of Krefeld; Günther Weymans; Zoltan Kricsfalussy, both of Leverkusen; Wolfgang Alewelt; Jürgen Heuser, both of Krefeld, all of Fed. Rep. of Germany

[73] Assignee: Bayer Aktiengesellschaft, Leverkusen, Fed. Rep. of Germany

[21] Appl. No.: 891,506

[22] Filed: May 29, 1992

[30] Foreign Application Priority Data

Jun. 4, 1991 [DE] Fed. Rep. of Germany ....... 4118232

[51] Int. Cl.$^5$ .............................................. C08G 64/20
[52] U.S. Cl. ..................................... 528/196; 526/59; 526/60; 528/198; 528/199
[58] Field of Search ............... 528/196, 198, 199; 526/60, 59

[56] References Cited

U.S. PATENT DOCUMENTS

| 3,945,969 | 3/1976 | Horn et al. | 260/47 XA |
| 4,122,112 | 10/1978 | Koda et al. | 260/463 |
| 4,616,077 | 10/1986 | Silva | 528/371 |
| 4,737,573 | 4/1988 | Silva et al. | 528/371 |
| 4,810,813 | 3/1989 | Kosky et al. | 558/281 |
| 4,956,313 | 9/1990 | Cote et al. | 437/203 |
| 4,959,456 | 9/1990 | Ashida et al. | 528/371 |
| 5,011,967 | 4/1991 | Silva et al. | 558/281 |
| 5,034,505 | 7/1991 | Silva et al. | 528/371 |
| 5,043,203 | 8/1991 | Fyvie et al. | 528/198 |

FOREIGN PATENT DOCUMENTS

306838 3/1989 European Pat. Off. .
1409614 10/1975 United Kingdom .

*Primary Examiner*—Harold D. Anderson
*Attorney, Agent, or Firm*—Joseph C. Gil; Aron Preis

[57] ABSTRACT

An improvement to the continuous process for the production of polycarbonates by interphase polycondensation is described. Accordingly, the organic phase and the aqueous phase are combined in a tube, forming chlorocarbonic acid ester and further alkali hydroxide is added at, or shortly after, the maximum concentration of said ester is reached. The resulting emulsion is then changed to an oil-in-water emulsion which is then separated and worked up in known manner.

2 Claims, No Drawings

CONTINUOUS PRODUCTION OF POLYCARBONATES

FIELD OF THE INVENTION

The invention concerns the interfacial polycondensation process for the preparation of polycarbonates and more particularly an improvement to the process.

SUMMARY OF THE INVENTION

An improvement to the continuous process for the production of polycarbonates by interphase polycondensation is described. Accordingly, the organic phase and the aqueous phase are combined in a tube, forming chlorocarbonic acid ester and further alkali hydroxide is added at, or shortly after, the maximum concentration of said ester is reached The resulting emulsion is then changed to an oil-in-water emulsion which is then separated and worked up in known manner.

BACKGROUND OF THE INVENTION

Continuous processes for the production of condensates using phosgene (for example, the production of aromatic polycarbonates or polyester carbonates or oligomers thereof) by the two-phase interfacial method generally have the disadvantage that more phosgene than is necessary for the product balance has to be used in order to accelerate the reaction and/or to improve phase separation. The excess phosgene is then degraded in the synthesis in the form of secondary products, for example additional sodium chloride or alkali metal carbonate compounds.

For example, a phosgene excess—based on the diphenolate used—of 20 to 60 mol-% is used in the continuous two-phase interfacial process for the conventional production of aromatic polycarbonates.

Thus, DOS 2,305,144 describes a process for the continuous production of polycarbonates, in which the two reactive phases are combined in the presence of amines in a mixing zone under essentially oil-in-water emulsion conditions and the phosgenation step takes place in a reaction zone after mixing. Specially designed flow arrangements are intended to ensure that the volume-time yield of the reaction is increased. The disadvantage lies in the large quantity of aqueous phase which promotes secondary phosgene reactions.

According to DOS 2,353,939, the properties of a polycarbonate produced by the two-phase interfacial method are said to be improved by controlling the reaction through adjustment of the pH value. The disadvantage lies in the excess phosgene used, in addition to which the process is not continuous.

According to the teaching of EP 0,282,546 chlorocarbonate terminated condensates are said to be obtained with high phosgene yields by a version of the two-phase interfacial process in which a stable diphenol/water/sodium hydroxide suspension and phosgene are continuously introduced at the same time into an organic phase and the reaction product is subsequently isolated. pH values of 2 to 5 are maintained during the reaction. Disadvantages arise out of the technical problems involved in dosing the suspension and the low pH value which considerably increases the phosgenation time.

According to EP 0,263,432, chloroformyl-terminated condensates or polycarbonates can be produced from aqueous diphenolate solution and organic solution by introducing phosgene into a heterogeneous mixture at pH values of 8 to 11, at temperatures of 15 to 50° C. and with a phosgene excess of at least 10 mol-% and continuing the phosgenation reaction with simultaneous introduction of alkali metal or alkaline earth metal hydroxides.

According to DOS 2,725,967, it is favorable to the phosgene yield of a continuous process if the aqueous phase and the organic phase containing dissolved phosgene are initially combined in a tube and subsequently introduced into a reactor of the tank type. The residence time in this tube should be between 0.5 and 15 seconds. The phosgene excess of the reaction is at least 10 mol-%. The disadvantage lies in the fact that the phosgene excess is still extremely high. In addition, the process is attended by the disadvantage that the phosgenation reaction takes place at unfavorable phase ratios (oil-to-water=0.2 to 1) so that separation of the two phases on completion of the reaction is definitely possible.

According to EP 0,306,838-A2, the phosgenation reaction is monitored in situ using an automatic chlorine detector. Carrying out the process in this way suppresses variations in the chemism of the reaction and is said distinctly to improve the technical properties of the polycarbonates. The concept on which the process is based lies in the recycling of unreacted diphenolate to the process. However, the process is attended by the disadvantage of secondary phosgene reactions which even take place during recycling.

According to EP-0,339,503-A2, the secondary phosgene reactions are said to be increased by the presence of a high initial sodium hydroxide concentration. According to this patent, therefore, the diphenol/sodium hydroxide/water solution is combined with the organic phases in an alkali/hydroxy ratio of less than 2:1 (less than equivalent quantity of alkali metal hydroxide), oligomers having a molecular weight of 300 to 3,000 g/mol being formed in this first reaction stage. The water-to-oil phase ratios are greater than 1. In addition, the secondary phosgene reactions are still extremely unfavorable.

According to EP-0,305,691-A2, a fine emulsion produced by intensive mixing is favorable to the reaction in the two-phase interfacial process, albeit with a very large excess of phosgene (20 to 100 mol-% excess). The large quantity of phosgene promotes good phase separation despite intensive mixing of the emulsion at the beginning of the reaction. However, the phosgene yield is extremely unfavorable.

Accordingly, the continuous production of condensates or polycondensates by the two-phase interfacial method has hitherto only been possible with a large excess of phosgene or in unfavorable phase ratios (use of water) or with phase separation problems.

According to non prepublished U.S. Pat. No. 5,043,203 polycarbonate is also prepared by a process comprising several steps. In contrast to the procedure according to instant invention there is no separate formation of a bisphenolate-solution at the beginning of the process. The corresponding European equivalent to the U.S. Pat. No. 5,043,203 has the number 0456052.

DETAILED DESCRIPTION OF THE INVENTION

It has now been found that secondary phosgene reactions in the continuous production of polycarbonates by the two-phase interfacial method can be avoided by the following:

In the process where there are continuously reactively combined in a tube using a mixer, an organic phase and an aqueous phase, to form a chlorocarbonic acid ester oligomer and where the organic phase contains a solvent (the solvent being suitable for dissolving polycarbonate, for instance methylene chloride, chlorobenzene and mixtures thereof) and phosgene and where the aqueous phase contains water and a mixture of alkali metal hydroxide and diphenol the improvement entails (i) limiting the amount of said alkali metal hydroxide to the minimum amount necessary to dissolve the diphenol at the temperatures and pressures prevailing in the reaction, and (ii) adjusting the volume ratio of the organic phase to aqueous phase so that a water-in-oil emulsion is formed during the phosgenation reaction, and (iii) introducing additional alkali metal hydroxide at, or shortly after reaching, the maximum concentration of chlorocarbonic acid ester in the solution.

The maximum of the chlorocarbonic acid ester concentration is preferably characterized by an absorption maximum of the chloroformyl band in the IR spectrum run by the ATR-IR method (attenuated total reflection infrared method).

For the further production of the polycarbonates, the oligomer may then be condensed from this water-in-oil emulsion by known method with addition of catalysts, for example tertiary amines, to the polymer, the emulsion changing into a readily separating oil-in-water emulsion through reaction of the terminal phenolate groups before, during or after addition of the catalysts.

Accordingly, the present invention relates to a process for the continuous production of polycarbonates by the two phase interfacial method from
a) diphenols,
b) phosgene,
c) optionally chain terminators,
d) optionally catalysts and optionally
e) branching agents
in a mixture of aqueous alkaline phase and organic solvent phase, characterized in that 1. the organic phase and the aqueous phase are continuously combined in a tube using a mixer, 1.1 the organic phase being a solvent suitable for the polycarbonate, for example CH chlorobenzene or a mixture thereof and already containing the phosgene, 1.2 the aqueous phase consisting of water and a mixture of alkali metal hydroxide and phenolic components so that just enough alkali metal hydroxide is present to dissolve the phenolic reaction components at the reaction temperatures and pressures and 1.3 the phase ratios of organic phase to aqueous phase being adjusted so that a water-in-oil emulsion is formed during the subsequent phosgene reaction, between 0.5 and 0.7 mol phosgene being used per mol phenolic OH, 2. the formation of chlorocarbonic acid ester groups being followed from the absorption maximum of the chloroformyl band in the IR spectrum (run by the ATR-IR method attenuated total reflection infrared method) and more alkali metal hydroxide being introduced at, or shortly after reaching, the maximum chlorocarbonic acid ester concentration, so that an OH concentration of 0.1 to 0.5% by weight is established in the aqueous phase and optionally 3. the polycarbonate oligomer is condensed in known manner with addition of catalysts, for example tertiary amines, to the high molecular weight polycarbonate, 4. the emulsion changing before, during or after the addition of catalyst into an oil-in-water emulsion which can readily be separated and worked up in known manner.

The polycarbonates obtainable by the process according to the invention are, on the one hand, oligocarbonates having degrees of polycondensation of about 3 to 10 structural units or polycarbonates of relatively high molecular weight, i.e. with average weight average molecular weights of 5,000 to 80,000 g/mol, as measured in known manner by gel permeation chromatography.

The molecular weights to be established may be controlled through the quantity of chain terminator or, in the absence of a chain terminator and a catalyst, through the reaction time and the quantity of phosgene used, based on diphenol.

Suitable diphenols for the process according to the invention are diphenols corresponding to the formula HO—Z—OH, in which 2 is a C6-30 aromatic radical which may contain one or more aromatic nuclei, may be substituted and may contain aliphatic radicals or cycloaliphatic radicals or heteroatoms as bridge members. Examples are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, $\alpha,\alpha$-bis-(hydroxyphenyl)-diisopropylbenzenes and nucleus-alkylated and nucleus-halogenated compounds thereof.

These and other suitable diphenols are described, for example, in U.S. Pat. Nos. 3,028,365, 2,999,835, 3,148,172, 3,275,601, 2,991,273, 3,271,367, 3,062,781, 2,970,131 and 2,999,846, in DE-OSS 1,570,703, 2,063,050, 2,063,052, 2,211,956, in FR-PS 1,561,518 and in DE-OS 3,833,953 (LeA 26 397). Preferred diphenols are, in particular, 2,2-bis-(4-hydroxyphenyl)propane, 2,2-bis-(3,5-dimethyl-4-hydroxyphenyl)-propane, 1,1-bis.(4-hydroxyphenyl)-cyclohexane, 1,1-bis-(4-hydroxyphenyl)- 3,3,5-trimethyl cyclohexane. It is emphasized here that the process according to the invention may be used for virtually all known diphenols which dissolve in an aqueous phase in the presence of alkali metal hydroxide and water.

Known chain terminators or branching agents may be added to the diphenols in known quantities before, during or after the phosgenation.

Suitable chain terminators and branching agents are known from the literature (see, for example, DE-OS 3,833,953). Preferred chain terminators are phenol, cumyl phenol, isooctyl phenol, p-tert. butyl phenol. Preferred branching agents are trisphenols and tetraphenols and also 3,3-bis-(3-methyl-4-hydroxyphenyl)-2-oxo-2,3-dihydroindole.

Sodium hydroxide or potassium hydroxide is used as the alkali metal hydroxide. Alkaline earth metal hydroxides may also be used.

As already mentioned, the organic phase essentially contains a substantially water-immiscible medium which dissolves the polycarbonate at the reaction temperatures and reaction pressures, such as for example methylene chloride or monochlorobenzene. The preferred medium is substantially pure methylene chloride or a mixture of methylene chloride and chlorobenzene. The organic phase already contains the phosgene in dissolved form before it is combined with the aqueous phase.

The aqueous phase is a mixture of alkali metal hydroxide, diphenol and water and, optionally, the chain terminator and, optionally, the branching agent. It is crucial that, before the aqueous solution is combined with the organic phosgene-containing solution, the aqueous phase should only contain just enough alkali metal hydroxide to dissolve phenolic components in the aqueous phase. This is of course dependent on the reaction temperatures and the desired diphenol concentrations. The quantities of chain terminator and branching agent may be disregarded. For a given reaction temperature and diphenol concentration, the expert is able by simple solubility tests, in which the quantity of alkali metal hydroxide is varied, to determine the optimal composition of the aqueous phase required for the process according to the invention.

Diphenol is introduced into the aqueous starting phase in such quantities that the diphenolate does not precipitate, generally in quantities of 10 to 20% by weight diphenolate, based on the total quantity of aqueous phase.

The volume ratios of aqueous phase to organic phase are dependent by weight on the substances used (for example solvent) They are generally selected so that the aqueous phase is between 20 and 58% by volume and the organic phase between 80 and 42% by volume. In cases where high "oil-to-water" phase ratios are used, it may be necessary for the subsequent reaction stages to introduce more aqueous phase—optionally of different composition. The phase ratios are preferably selected so that a "water-in-oil" emulsion is formed during the phosgenation and an "oil-in-water" emulsion is formed during the polycondensation without significant further addition on completion of the reaction. In this case, too, the exact phase ratios for this procedure are dependent on the starting materials. In general, they are preferably between 42 and 58% by volume aqueous phase and 58 and 42% by volume organic phase.

The aqueous and organic phases are continuously combined in a tube using a mixer. Suitable mixers are any types which combine two substances in a tube. It is not necessarily the mixing performance of the mixer which is important. Thus, suitable mixers are, for example, mixing elements such as, for example, special nozzles or static mixers. Particularly suitable mixing nozzles are two component nozzles having a residence and mixing time of at least 20 milliseconds, such as for example solid-cone nozzles, hollow-cone eccentric nozzles, axial hollow-cone nozzles, pneumatic spray nozzles and annular multiple-bore nozzles. Suitable static mixers are, preferably, static mixers of the BKM type. As already emphasized, it is important to ensure that the phase ratios for the selected mixing element are established in such a way that a water-in-oil emulsion is at least briefly present after mixing.

The ATR-IR method uses the physical principle of total attenuated reflection. In this method, laser light of predetermined wavelength is introduced into a elongate IR crystal, of which the surface comes into contact with the reactive water-in-oil emulsion, at one end and laser light modified by the organic surface coverage of the crystal emerges at the other end and is analyzed in a Fourier transform infrared analyzer (for example of the type manufactured by the Nicolet company). The chloroformyl band (stretching vibration of the CO—O—linear bond of the O—CO—Cl group) in the wave number range from 1,100 to 1,200 cm, is used as indicator (relative measure) In this way, a measure of the relative bis-chlorocarbonic acid ester concentration can be determined on-line by applying the ATR-IR method at any point of the flow tube through which the two reactive (phosgene-containing) solutions flow.

According to the invention, additional alkali metal hydroxide is added when the maximum concentration of the chlorocarbonic acid ester in the two-phase mixture thus characterized is reached or up to 5 seconds thereafter. In practice, the optimum addition point in an industrial plant may be determined, for example, by measuring the time taken to reach the maximum carbonic acid ester concentration in a discontinuous test (in which the reaction is carried out in a stirred tank) and using this residence time to locate the optimum point at which to add the alkali metal hydroxide in the industrial plant. As already described, the addition of more alkali metal hydroxide should begin at the earliest when the maximum chlorocarbonic acid ester concentration is reached. It may be useful, depending on the starting materials used and their kinetics with one another, to begin this addition only 1 to 5 seconds after the ATR-IR absorption maximum has been reached and, for example, to arrange the point at which the alkali metal hydroxide is added at the end of the flow tube or in the reaction vessel used for the rest of the process (stirred tank, pump circulation reactor, spiral coil reactor, etc.) The interval between the time at which the maximum chlorocarbonic acid ester concentration is reached and the time at which the alkali metal hydroxide is added should be no more than 3 seconds.

The quantity of alkali metal hydroxide added is generally up to another 2 mol alkali metal hydroxide per mol diphenol used. It is also dependent on the pH values to be established in the range from pH 9 to pH 14 in order to continue the reaction to the oligomer and polymer. The advantage of the process according to the invention lies in the fact that secondary phosgene reactions during the phosgenation reaction itself are suppressed and the yield of phosgene increased through the time at which the alkali metal hydroxide is added.

The high molecular weight polycarbonates obtainable by the process according to the invention are known plastics which may be processed by standard methods to moldings of any kind, including for example films or sheets, and which may be used for any of the industrial applications typical of polycarbonates, for example in the electrical field, in house construction (cover panels and facings) and in the safety field.

EXAMPLE 1

The following continuous reaction was used..

Process step 1: A multiple-bore nozzle in which the aqueous phase is combined with the organic solution through the radial bores in the core of the nozzles.

Process step 2: A flow tube (diameter approx. 25 mm, length approx. 1 m) A pump circulation reactor equipped with a T-type connector, into which the above-mentioned flow tube opens, a pump, a heat exchanger, an overflow vessel and a T-shaped removal point, total volume approx. 45 I.

The following substances are used in process step 1:
118.1 kg/h 15% by weight diphenol solution containing as diphenol 2,2'-bis-(4-hydroxyphenyl)-propane (bisphenol A) and 2 mol sodium hydroxide per mol diphenol and present at 25° C./normal pressure
8.5 kg/h phosgene (10 mol-% excess)
113.0 kg/h solvent mixture of 50% by weight methylene chloride and monochlorobenzene.

More sodium hydroxide is introduced in process step 2 so that an alkali concentration of 0.2% by weight is established in the pump circulation reactor. In addition, 3.0 kg/h chain terminator solution consisting of 7.8% by weight phenol in the solvent mixture mentioned above are introduced into the pump circulation reactor.

DESCRIPTION OF THE TEST

At the beginning of the reaction, all the starting materials are present at a temperature of around 25° C. The circulation loop of the reactor contains a heat exchanger which dissipates the heat of reaction generated up to that point to a temperature level of around 30° C. The samples are removed at a removal point in the pump circuit and analyzed.

The aqueous and organic phases are continuously mixed in a multiple-bore nozzle and introduced into the pump circulation reactor without dissipation of heat. A "water-in-oil" emulsion is present in the mixing nozzle and in the flow tube.

The concentration of the chlorocarbonic acid ester is measured along the tube during the continuous test by the ATR-IR method. In regard to throughput, the test was carried out so that the maximum concentration had been exceeded by the time the end of the flow tube was reached. More sodium hydroxide was added there. The interval between the time the maximum was reached and the addition of the sodium hydroxide was about 2 seconds.

Result of sample analysis: Residual BPA content 400 ppm Phosgene excess: 10 mol-%

COMPARISON EXAMPLE

As in the Example according to the invention, but with addition of the sodium hydroxide to the aqueous phase before it is combined with the organic phase in the perforated disk nozzle, the product is removed at the removal point of the pump circulation reactor.

Result of sample analysis: Residual BPA content 800 ppm Phosgene excess: 10 mol-%

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the two phase interfacial process for the continuous production of polycarbonate from diphenols and phosgene and the optional chain terminators, catalysts and branching agents in a mixture of an aqueous alkaline phase and an organic solvent phase wherein organic phase comprise phosgene and a solvent for polycarbonate, and wherein aqueous phase contains water and a mixture of alkali metal hydroxide diphenols and the optional chain terminators and branching agents and wherein said organic phase and said aqueous phase are continuously combined in a tube containing a mixer the improvement comprising (i) limiting the amount of said alkali metal hydroxide in said aqueous phase to the minimum amount necessary to cause dissolution of said diphenols and the optional chain terminators and branching agents at the prevailing reaction temperatures and pressures,
   (ii) adjusting the volume ratio of said organic phase to said aqueous phase to form a water-in-oil emulsion during the subsequent phosgene reaction where between 0.5 and 0.7 mol of phosgene is reacted per mol of phenolic OH,
   (iii) continuously monitoring the concentration of the formed chlorocarbonic acid ester and
   (iv) introducing additional alkali metal hydroxide at, or shortly after reaching, the maximum concentration of chlorocarbonic acid ester so that an OH concentration of 0.1 to 0.5% by weight is established in the aqueous phase, and
   (v) condensing the oligomer thus produced with the addition of at least one catalyst to form high molecular weight polycarbonate.

2. The process of claim 1 wherein said monitoring comprises measuring the absorption maximum of the chloroformyl band in the IR spectrum.

* * * * *